Patented Nov. 8, 1938

2,135,589

UNITED STATES PATENT OFFICE 2,135,589

PROCESS FOR REMOVING MUD SHEATHS FROM OIL WELLS

Louis T. Monson, Alhambra, Calif., assignor to Tretolite Company, Webster Groves, Mo., a corporation of Missouri No Drawing. Application June 6, 1935, Serial No. 25,213

4 Claims. (Cl. 166—21)

This invention has for its main object to provide a practical process for effectively removing, from a well or from an oil- or gas-bearing formation in a well, a substantially impervious, mud-like sheathing or coating, resulting from the use of drilling fluids in the drilling operation or resulting from the presence in the hole, at some other time, of fluids capable of producing such sheaths.

Another object is to increase the productivity of a well by removing from the face of the producing formation various solids, such as natural clays, deposited thereon during drilling or subsequently.

Still another object of the invention is to make possible the recovery of oil or other fluids from relatively shallow formations, which were penetrated during the drilling to greater depths and which were "mudded off" by deposition of solids from the drilling fluid.

By the term "mudded-off formation" I mean a formation or stratum, the walls of which have been more or less effectively sealed by an impervious sheath of solids derived from the drilling fluid. Naturally-occurring clays are commonly used to prepare drilling fluids. In some cases, drilling wells "make their own mud", the formations encountered containing clay of such properties that it is unnecessary to import the ingredients for preparing the drilling fluids. Where natural clays are found deficient in one or more properties, they may be conditioned to improve their specific gravity characteristic, their viscosity, or their gel-forming propensities by the addition of other materials. For example, weight materials, such as barite or hematite, may be added; or bentonite may be used to improve the viscosity and gel-forming characteristics. In rarer cases, the drilling fluid may be prepared entirely from a weighting material such as barite, and a stabilizer, such as bentonite, in the total absence of naturally-occurring clays or "muds". In this description, I shall use the term "mud" to include drilling fluids of any and all of the foregoing types, and to apply to all of them with equal force.

The deleterious effects of drilling muds are of several kinds, the principal one being the deposition of mud sheaths on the face of the formation penetrated. While this deposition of mud sheath is desirable in the upper portions of the hole, it is extremely undesirable when the producing horizon has been reached. It is also undesirable in the upper portions of the hole when and if it later becomes necessary or desirable to test the productivity of such upper strata.

The problem thereby presented exists in wells drilled into high pressure formations, as well as in wells penetrating low pressure areas, and in partially or entirely depleted formations. In semi-depleted fields, where formation pressures have declined to small values, the problem is most serious. There are numerous instances on record where, although wells have been drilled into proven producing horizons, no oil can be commercially produced at present; and where, unless some means is found to remove the sheaths, large reserves of oil will be lost.

Various mechanical means have been attempted to remove the sheaths, with only partial success. Washing with water has been attempted, in many cases unsuccessfully. In the cases of some oil wells previously washed unsuccessfully with water, application of my process has resulted in removal of a large amount of mud, usually with very gratifying consequences as to increased productivity.

The process which constitutes the present invention may be practised in various ways, and may be applied at various times in the life of a well. It may be applied immediately upon completion of the well, or even prior to completion. It may be used on wells during or upon depletion. It may be used on wells, which, upon depletion of a lower formation, or upon the discovery that such deeper formation is unproductive, have been plugged back to higher formations previously disregarded in drilling, and which may now be required to be explored. It may be used on wells, which, because of the presence of such mud sheaths, have never been productive. My process is also applicable to those cases where the sheaths result from mud introduced into a well subsequent to drilling, e. g., for the purpose of killing the well. It is also applicable in those comparatively rare cases where mud sheaths are deposited during cable-tool drilling.

After application of my reagent to one well in the Ventura Avenue field of California, 900 ft. of mud was found in the well. When the mud was removed, the well, which was entirely non-productive at the time the process was applied thereto, produced an average of more than 125 bbls. per day. In a second application, a well in the vicinity of Taft, California, which had previously been washed unsuccessfully with water, yielded a large quantity of mud by the application of my process. Its productivity was increased more than 30% thereby.

The process constituting my invention is not to be confused with any process designed to remove wax deposits from oil wells. Such wax deposits constitute a recurring problem. On the contrary, once the mud sheath has been removed by means of my process, the problem cannot recur in that well.

The process which constitutes my invention consists in the application of a reagent of the kind described below, to a mud sheath, however produced, which exists in a well, e. g., on the walls of an oil-bearing formation, in such manner that the relatively impervious sheath is removed, and the well is rendered productive or the existing productivity thereof is increased. The exact nature of the action taking place when the reagent is used is unknown to me.

The reagent which I employ in practising my process consists of a relatively stable aqueous dispersion, containing a water-insoluble organic liquid capable of acting as an oil solvent, the said reagent being produced by dispersing a liquid of that kind in an aqueous medium. The aqueous medium itself constitutes a dispersion of an organic detergent-like material in water.

By the term "relatively stable aqueous dispersion," I mean one that is not resolved into its components spontaneously, even on standing for protracted periods of time, e. g., for an hour or more.

By the term "organic detergent-like material" I mean to include substances containing one or more hydrophile groups, such as —COOX, —SO$_3$H, —SO$_4$H, etc., (where X is an alkali metal or its equivalent and the other letters and figures have their ordinary chemical significance); and also containing a hydrophobe group. The latter group is usually, although not necessarily entirely, hydrocarbon in character. Such substances have molecular weights in excess of 200. They are dispersible in water. Their aqueous dispersions exhibit surface tensions markedly lower than that of water. For example, 1% dispersions usually possess surface tensions less than half that of water. They may be employed in completely neutralized, partially neutralized, or unneutralized state, so long as they satisfy the above requirements.

I prefer to employ a considerable excess of dispersing agent over what would be exactly required to effect dispersion of the water-insoluble organic liquid in water. Such excess further prevents any separation of the phases, enhancing the stability of the dispersion to such an extent that it will remain stable for at least several hours. The excess of dispersing agent also acts to lower the surface tension of the whole reagent, because of which the reagent exhibits a marked penetrating effect. In this way, it is carried into the crevices and irregularities of the deposit, weakening the bond between the mud sheath and the supporting wall. It is also enabled by this means to penetrate the formation to considerable distances and to facilitate the return of drilling water to the hole.

I do not desire to be limited to any specific water-insoluble organic liquid, other than that it shall be capable of acting as an oil solvent. The choice of liquid employed is influenced in part by the bottom hole temperatures expected to be encountered. The character of the oil being produced may also affect the choice and the character of the mud used in drilling the well may also be important. The choice will frequently depend on relative cost of solvents.

I have found that a mixture of organic liquids having the specific property of dissolving petroleum oil is very effective. One such mixture which I have employed contains benzol, toluol, carbon tetrachloride, tetralin and kerosene.

The organic detergent-like materials which may be employed to disperse the water-insoluble organic liquid or liquids may vary in nature. I have found, in general, that the soap-like materials, such as sulfonated saponifiable oils, sulfonated fatty acids, petroleum sulfonic acids, and the salts of such substances, are very desirable. If extremely hard water is to be encountered, it might be preferable to employ, as organic detergent-like materials, substances which effectively resist such hardness. For example, certain sulfonated materials of good hardness-resisting characteristics, such as some of the alkylated aromatic sulfonic acids or their salts, may be used.

The proportions of oil solvent and dispersing agent may be varied within wide limits. I have prepared my reagent in one form in which it contained 4 parts of dispersing agent to 1 part of oil solvent. I have likewise prepared it in a form in which it contained 4 parts of oil solvent to 1 part of dispersing agent. Both forms were relatively stable, and did not separate appreciably into their components, on standing for protracted periods of time. Therefore, I do not wish to be limited to the exact proportions of ingredients recited in the following example, or to those specific ingredients recited, the example given being merely illustrative.

My preferred reagent is a mixture of kerosene, benzol, toluol, carbon tetrachloride and tetralin, dispersed in water by means of a mixture of sulfonated saponifiable oil and petroleum sulfonate. The most convenient manner of preparing and marketing the reagent is to make a homogeneous mixture of the organic oil solvents and the organic detergent-like materials, and to dilute this, upon use, with water as required. Agitation may be required to produce the aqueous dispersion to be used. I have found that a mixture of the following composition may be prepared as a homogeneous liquid, which may subsequently be readily dispersed in water by agitation to form a dispersion, the latter constituting my reagent:

| | Lbs. |
|---|---|
| Benzol | 35 |
| Tetralin | 40 |
| Toluol | 15 |
| Carbon tetrachloride | 16 |
| Kerosene | 8 |
| Sulfonated saponifiable oil | 10 |
| Petroleum sulfonate | 25 |

By diluting four parts by volume of the above mixture with 96 parts by volume of water, I have been enabled to prepare a reagent with which I have successfully removed large volumes of mud from the oil wells which I have treated therewith, and have increased their productivity greatly.

From the foregoing, it will be understood that my invention, broadly stated, consists in subjecting a mud sheath of the kind mentioned to the action of a reagent of the kind described. Merely injecting such reagent into a well which has been mudded off results in the more or less complete removal of the sheath. I have found that agitating the reagent in the well, after it has been injected therein, usually produces more favorable results, however. Any of the various methods available for agitating fluid in the hole such as swabbing or use of perforation washers may be applied during the injection of the reagent, or before or after the period during which the reagent may be allowed to stand quiescent in the well. I have found that agitating the fluid after allowing the reagent to stand in the well for a period of time in order to penetrate and soften the sheaths, produces very favorable results. If a perforation washer is employed to agitate the fluid, it may be desirable to "spot" therewith, i. e., inject at various levels, additional quantities of the reagent, before agitating.

My preferred method of cleaning an oil well of mud sheaths is as follows: Remove any debris present in the bottom of the hole, for example, by bailing. Then replace the head of oil standing in the well as completely as possible with the reagent. Allow the reagent to stand in the hole for any desired time. (I have found that a period of standing ranging from 8 to 24 hours produces acceptable results.) Then introduce an additional quantity of reagent into the well and immediately thereafter agitate the fluid in the well by swabbing or operating a perforation washer therein. After agitating the reagent in the hole by any desired means, and so scrubbing or washing the sheath from the formation walls, swabbing or other means may be employed, if required or desired, to bring additional quantities of mud into the hole, and to start a flow of oil. The debris dislodged by the use of my reagent may be removed with a bailer, or in any other desired manner. The well is preferably not put on the pump until no further amounts, or only small amounts, of mud are being recovered.

The above-recited procedure for operating this process is exemplary, only. The procedure may be varied, as conditions may require. In all cases, however, it consists broadly in the application of my reagent to the mud sheaths in the well; and of course, subsequently removing from the well the debris accumulated in the well as the result of such application.

It will be obvious that my proces is applicable to the removal of any mud sheath present on the perforated pipe in the well, in addition to that present on the walls of the formation. The removal of the sheath from the formation wall, I consider the more important function of my process, however.

Having thus described my invention, what I claim as new and desire to secure by Letters Patent is:

1. A process for the removal of mud sheaths from geological formations penetrated during the drilling of wells, which consists in the application thereto of a reagent consisting of a relatively stable aqueous dispersion, in which the disperse phase is a water-insoluble organic liquid capable of acting as an oil solvent, and the continuous aqueous phase contains a dispersing agent in the form of a sulfonated organic material.

2. A process for increasing the productivity of wells, which consists in the application of a reagent consisting of a relatively stable aqueous dispersion, in which the disperse phase is a water-insoluble organic liquid capable of acting as an oil solvent, and the continuous aqueous phase contains a dispersing agent in the form of a sulfonated organic material, to the mud sheaths present on the geological formations penetrated during drilling, and the subsequent removal from the well of the solids which formerly constituted such sheaths.

3. A process for the removal of mud sheaths from geological formations penetrated during the drilling of wells, which consists in the application thereto of a reagent consisting of a relatively stable aqueous dispersion, in which the disperse phase is a water-insoluble organic liquid capable of acting as an oil solvent, and the continuous aqueous phase contains a sulfonated oil.

4. A process for increasing the productivity of wells, which consists in the application, to the mud sheaths present on the geological formations penetrated during drilling, of a reagent consisting of a relatively stable aqueous dispersion, in which the disperse phase is a water-insoluble organic liquid capable of acting as an oil solvent, and the continuous aqueous phase contains a sulfonated oil; and the subsequent removal from the well of the solids which formerly constituted such sheaths.

LOUIS T. MONSON.